J. W. KENNEDY.
Horse Blinders.

No. 152,384.

Patented June 23, 1874.

UNITED STATES PATENT OFFICE.

JOHN W. KENNEDY, OF CENTRAL VILLAGE, CONNECTICUT, ASSIGNOR TO HIMSELF AND WILLIAM H. KENNEDY, OF OBERLIN, OHIO.

IMPROVEMENT IN HORSE-BLINDERS.

Specification forming part of Letters Patent No. 152,384, dated June 23, 1874; application filed April 4, 1874.

*To all whom it may concern:*

Figure 1:
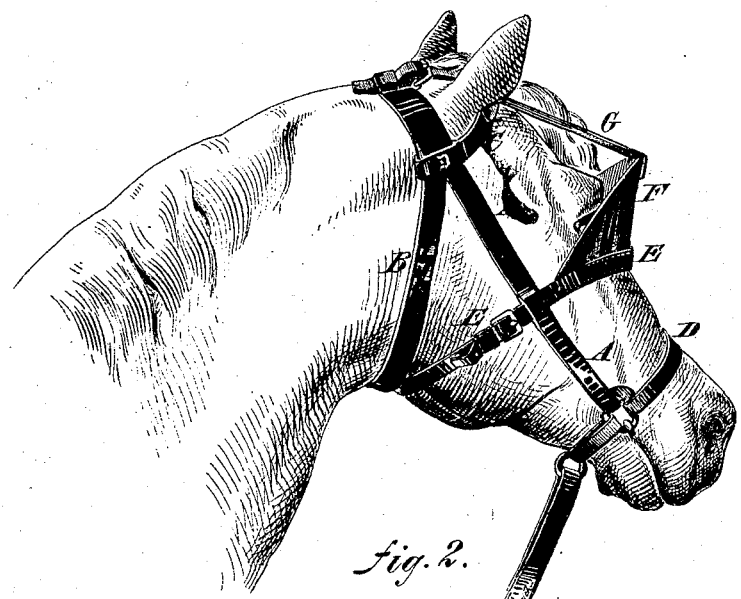
Figure 2:
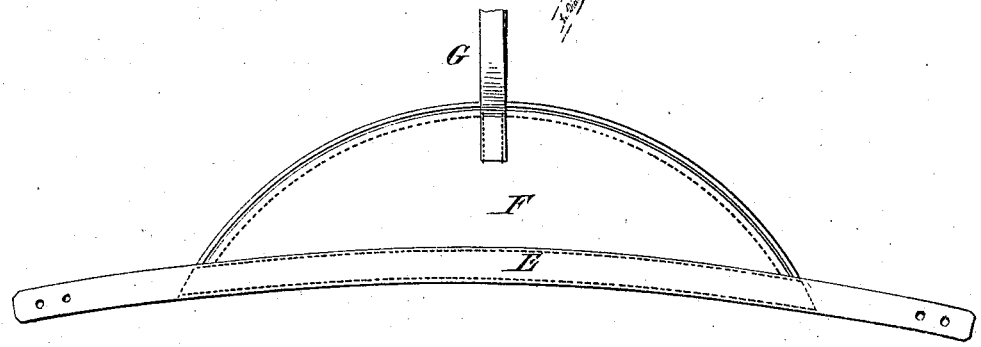

Be it known that I, JOHN W. KENNEDY, of Central Village, in the county of Windham and State of Connecticut, have invented a new and useful Improvement in Horse-Blinder, of which the following is a specification:

Figure 1 is a view showing my improved blinder applied to a horse's head. Fig. 2 is a detail view of the blinder.

Similar letters of reference indicate corresponding parts.

The invention consists of a blinder made independent of bridle or halter, and applicable to prevent horses from jumping over fences and thereby escaping from a pasture.

A represents the side or cheek straps, B the throat-latch, C the front strap, and D the nose-strap, of an ordinary headstall, about the construction of which parts there is nothing new. E is a strap buckling around the horse's head a little below the eyes, and to the forward part of which is attached the blinder F, the upper or free edge of which is made upon the arc of a circle. The lower edge of the blinder F, that is attached to the strap E, is concaved upon the arc of a circle considerably larger than that of the outer edge, the said arc being made larger or smaller, according as the blinder is required to stand out less or more from the horse's face. The blinder is further supported by a strap, G, the upper end of which is attached to the cheek-straps A upon the top of the horse's head. The lower end of the strap G is attached to the middle part of the free edge of the blinder F, as shown in Figs. 1 and 2. With this construction the light and air can have free access to the horse's eyes, while the blinder effectually prevents him from seeing in front.

This blinder is not for travel, but is a hamper, to be used to prevent horses from jumping the fence from pasture. My blinder has nothing to do with the nose-piece of the halter or bridle, and does not touch any part of the halter or bridle, except the loop on each side of the cheek-straps, through which it passes, and buckles under the lower jaw, with a small strap from the center of the blinder to the top of the headstall, to keep the blinder in an upright position. The blinder that keeps the horse from jumping can be removed, leaving a simple halter. My blinder passes under the eyes, stopping all vision from side views as well as front, and as the horse approaches a fence, not seeing it or the ground on the opposite side, he fears to and will not leap the fence.

Having thus described my invention, I claim as new and desire to secure by Letters Patent—

The detachable blinder F, provided with the straps E G, for attachment to the ordinary halter, substantially as shown and described.

JOHN W. KENNEDY.

Witnesses:
WILLIAM DYER,
GEORGE A. ROUSE.